US011900141B2

(12) United States Patent
Shah et al.

(10) Patent No.: US 11,900,141 B2
(45) Date of Patent: Feb. 13, 2024

(54) DIRECT ACCESS STORAGE FOR PERSISTENT SERVICES IN A DISTRIBUTED STORAGE SYSTEM

(71) Applicant: VMWARE, INC., Palo Alto, CA (US)

(72) Inventors: Mansi Shah, Palo Alto, CA (US); Subramanian Neelakantan, Bangalore (IN); Christian Dickmann, Munich (DE); Gopala Suryanarayana, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 475 days.

(21) Appl. No.: 17/232,214

(22) Filed: Apr. 16, 2021

(65) Prior Publication Data

US 2022/0206834 A1 Jun. 30, 2022

(30) Foreign Application Priority Data

Dec. 31, 2020 (IN) .............................. 202041057381

(51) Int. Cl.
*G06F 9/455* (2018.01)
*H04L 29/08* (2006.01)
*H04L 67/1097* (2022.01)

(52) U.S. Cl.
CPC ...... *G06F 9/45558* (2013.01); *H04L 67/1097* (2013.01); *G06F 2009/45575* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 2015/0304423 A1* | 10/2015 | Satoyama | H04L 67/1097 709/223 |
| 2015/0378853 A1* | 12/2015 | Sevigny | G06F 11/1484 714/4.11 |
| 2020/0034240 A1* | 1/2020 | Natanzon | G06F 11/1448 |

\* cited by examiner

*Primary Examiner* — Umut Onat
(74) *Attorney, Agent, or Firm* — Kim & Stewart LLP (57) ABSTRACT

An example virtualized computing system includes a cluster of hosts having a virtualization layer executing thereon and configured to manage virtual machines (VMs); first and second local storage devices in a first host, the first local storage device being part of a virtual storage area network (vSAN) and the second local storage device being exclusive of the vSAN; and an orchestration control plane, integrated with the virtualization layer and including a master server managing state of the orchestration control plane, the state including objects representing the hosts and the VMs, the orchestration control plane deploying a persistent application executing on a first VM, the persistent application storing persistent data on the second local storage device; and a virtualization management server configured to manage the cluster and to cooperate with the orchestration control plane to modify the state to notify the master server of a virtual infrastructure (VI) event.

20 Claims, 8 Drawing Sheets

DIRECT ACCESS STORAGE FOR
PERSISTENT SERVICES IN A DISTRIBUTED
STORAGE SYSTEM

RELATED APPLICATIONS

Benefit is claimed under 35 U.S.C. 119(a)-(d) to Foreign Application Serial No. 202041057381 filed in India entitled "DIRECT ACCESS STORAGE FOR PERSISTENT SERVICES IN A DISTRIBUTED STORAGE SYSTEM", on Dec. 31, 2020, by VMware, Inc., which is herein incorporated in its entirety by reference for all purposes.

Applications today are deployed onto a combination of virtual machines (VMs), containers, application services, and more implemented in a virtualized computing system. For deploying such applications, a container orchestrator (CO) known as Kubernetes® has gained in popularity among application developers. Kubernetes provides a platform for automating deployment, scaling, and operations of application containers across clusters of hosts. It offers flexibility in application development and offers several useful tools for scaling.

Some applications are stateful in that they store their data persistently in storage provided by the virtualized computing system (referred to herein as "stateful applications" or "persistent services"). For example, the virtualized computing system can provide a storage area network (SAN) that implements shared storage for various stateful applications to store their persistent data. Another type of shared storage is a virtual SAN (vSAN), which is an aggregation of local storage devices in hosts into shared storage for use by all hosts. A vSAN can be a policy-based datastore, meaning each object created therein can specify a level of replication and protection. The vSAN can then perform automatic placement decisions for replicas across the local storage devices of the hosts. A SAN can function similarly to a vSAN but includes storage devices separate from the hosts and accessible through a network. A stateful application deployed by Kubernetes, for example, can have one or more persistent volumes (PVs) stored in shared Storage (e.g., a SAN or a vSAN), where the PVs enjoy the replication and protection provided by the underlying shared storage.

Stateful applications (e.g., databases) can provide their own replication and data protection services for their data. Such stateful applications do not benefit from paying the cost of obtaining the same data protection services from the underlying shared storage system. For example, if a stateful application performs 3-way replication of its data, and the underlying storage system performs 2-way replication of the data, then six copies of the same data are created. However, the stateful application only obtains fault tolerance of the underlying storage system (e.g., the 2-way replication). The drop in fault tolerance occurs because the underlying shared storage system is not aware of the correlation between application replicas and is free to use the exact same placement for all replicas created by the application.

DETAILED DESCRIPTION

Techniques for providing a paravirtual storage layer for a container orchestrator in a virtualized computing system are described. In embodiments described herein, the virtualized computing system includes a cluster of physical servers ("hosts") referred to as a "host cluster." The host cluster includes a virtualization layer, executing on hardware platforms of the hosts, which supports execution of virtual machines (VMs). A virtualization management server manages the host cluster, the virtualization layer, and the VMs executing thereon. The virtualized computing system includes shared storage accessible by the host cluster. The container orchestrator executes in the virtualized computing system (e.g., on one or more VMs) and is configured to deploy and manage applications in the host cluster. In embodiments, the container orchestrator is a Kubernetes system that deploys and manages containerized applications in a cluster of VMs (a "Kubernetes cluster").

In one or more embodiments, the orchestration control plane comprises a supervisor container orchestrator having extensions that cooperate with the virtualization management server and agents installed in the virtualization layer. A host cluster having the orchestration control plane is referred to herein as a "supervisor cluster." A user interacts with the orchestration control plane to deploy and manage applications executing on the supervisor cluster. In embodiments, the orchestration control plane uses hosts to implement nodes, and VMs to implement pods, of a Kubernetes cluster. Kubernetes pods are implemented as "pod VMs," each of which includes a kernel and container engine that supports execution of containers. The container orchestrator (e.g., Kubernetes) executes in VMs alongside the pod VMs.

In one or more embodiments, some local storage devices in a host are excluded from being part of a virtual storage area network (vSAN) pool of storage. Such local storage devices excluded from the vSAN pool of storage are referred to herein as "direct-attach storage." Thus, storage devices that are part of the hardware platform of a host are referred to as "local storage devices" and those local storage devices excluded from the vSAN pool of storage are referred to as "direct-attach" storage devices. The term "direct-attach" refers to these local storage devices being available for direct attach to VMs, as discussed further herein. A persistent application deployed by the orchestration control plane can use direct-attach storage for placement of persistent data, rather than on the vSAN. This obviates the need to traverse the vSAN software stack, allowing the persistent application direct access to the local storage devices comprising the direct-attach storage. The persistent application controls placement of the persistent data across the direct-attach storage devices. These and further advantages and aspects of the disclosed techniques are described below with respect to the drawings.

Figure 1:
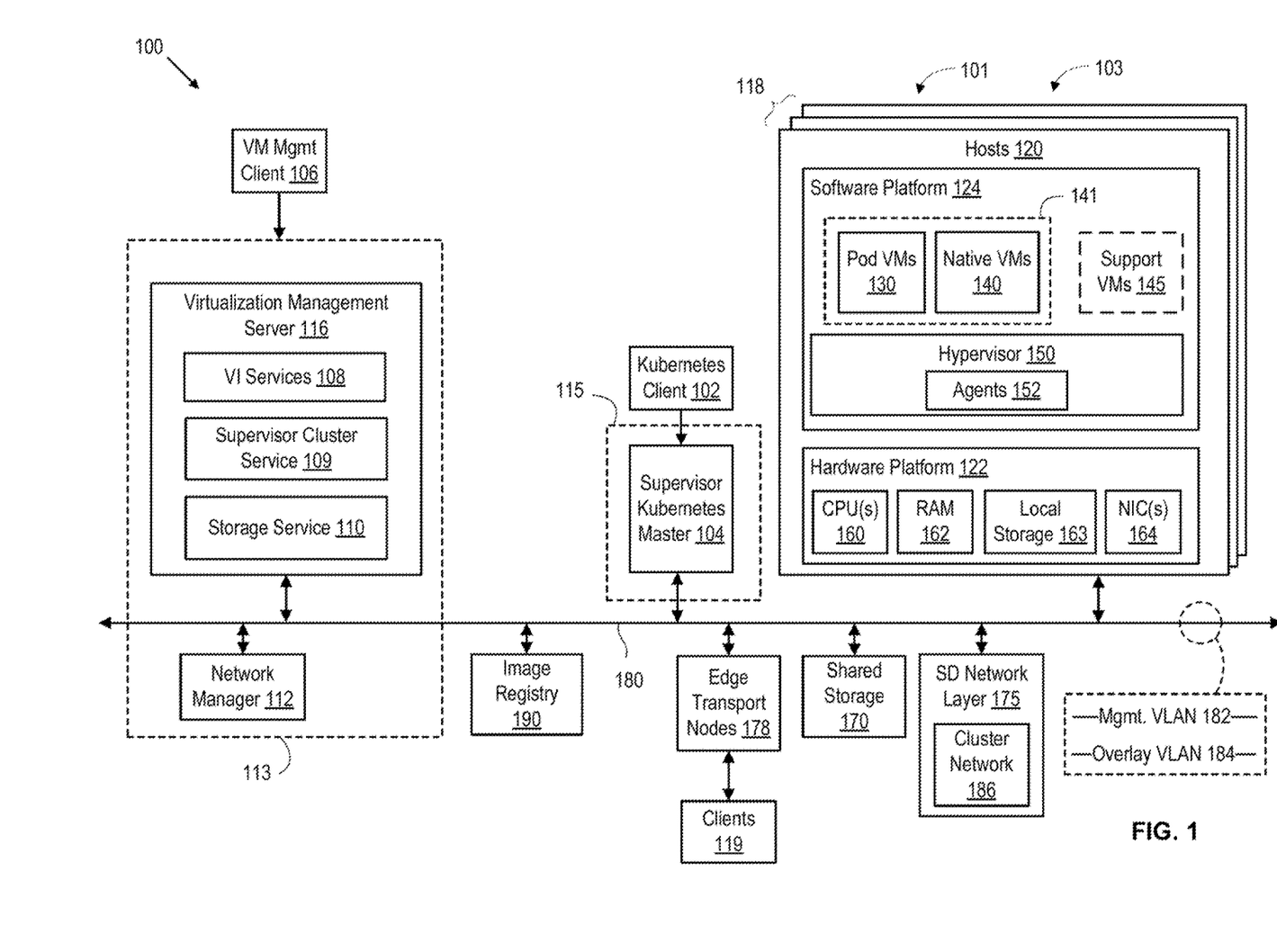
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162, one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170. Virtualization management server 116 can select which local storage devices in hosts 120 are pan of a vSAN for host cluster 118. In further embodiments described herein, virtualization management server 116 can omit some local storage devices from the vSAN for host cluster 118 for use as direct-attach storage. A user can request direct-attach storage for an application, as described further herein.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as pan of the VMware vSphere® solution made commercially available by VMware, Inc. of Palo Alto, CA.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized) (e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing.

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment. Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is earned by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications.

Virtualization management server 116 and network manager 112 comprise a virtual infrastructure (VI) control plane 113 of virtualized computing system 100. Virtualization management server 116 can include a supervisor cluster service 109, storage service 110, and VI services 108. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. For example, Kubernetes client 102 can be kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101, the techniques described herein do not require a supervisor cluster 101. In some embodiments, host cluster 518 is not enabled as a supervisor cluster 101. In such case, supervisor Kubernetes master 104, Kubernetes client 102, pod VMs 130, supervisor cluster service 109, and image registry 190 can be omitted. While host cluster 118 is show as being enabled as a transport node cluster 103, in other embodiments network manager 112 can be omitted. In such case, virtualization management server 116 functions to configure SD network layer 175.

Figure 2:
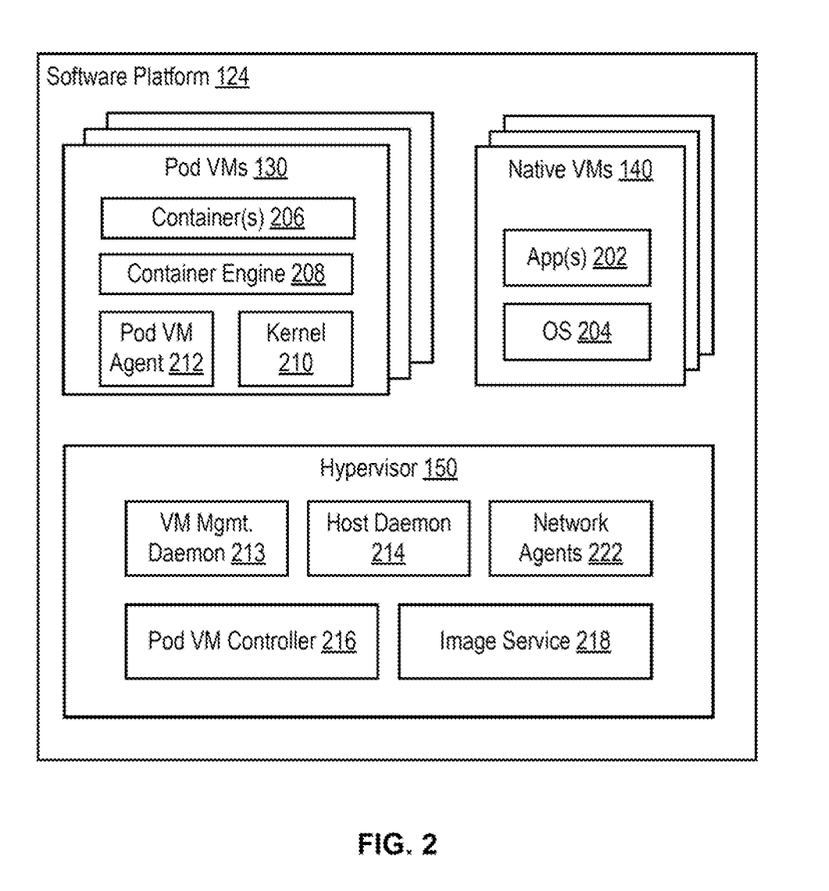
FIG. 2 is a block diagram depicting a software platform according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, an image service 218, and network agents 222. VM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130, pod VM controller 216, and image service 218 are omitted if host cluster 118 is not enabled as a supervisor cluster 101.

Figure 3:
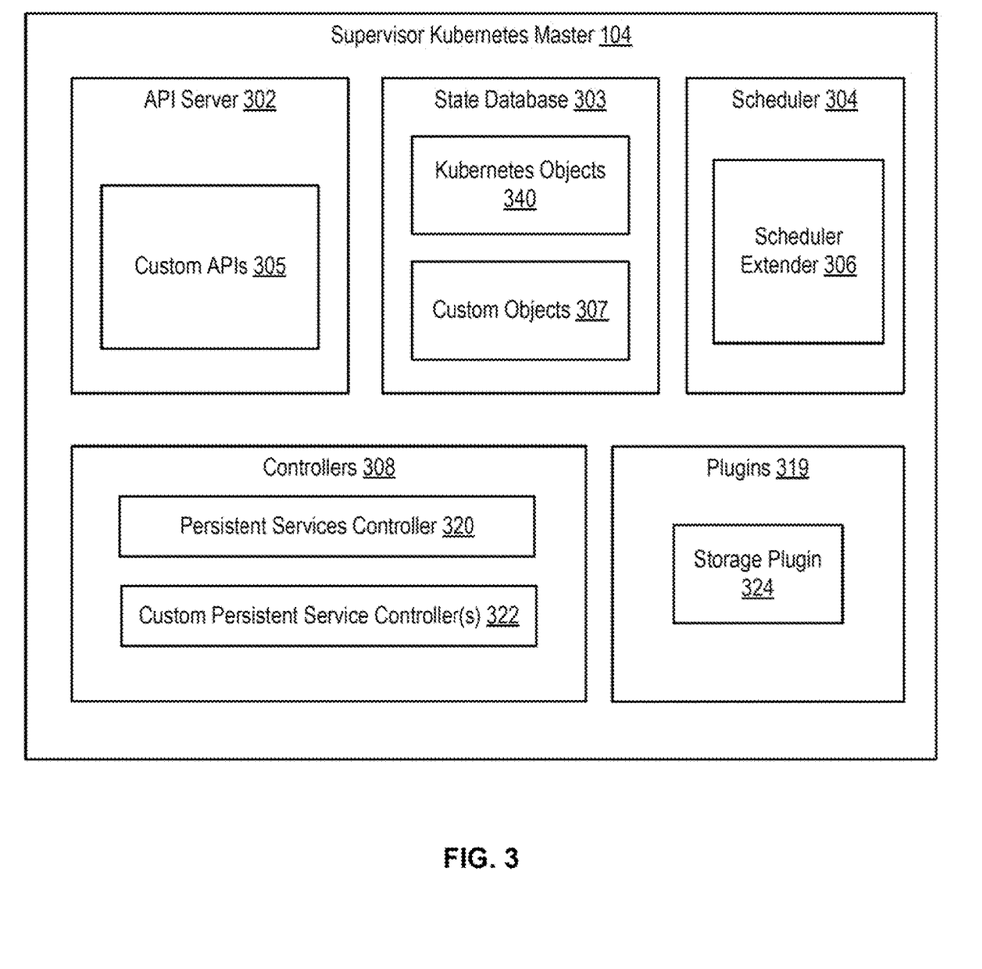
FIG. 3 is a block diagram of a supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, controllers 308, and plugins 319. Controllers 308 can include, for example, standard Kubernetes controllers, as well as custom controllers, such as a VM controller, guest cluster controllers, and platform lifecycle controller (PLC). Plugins 319 can include, for example, a network plugin and a storage plugin. In the embodiment shown, controllers 308 include persistent services controller 320 and one or more custom service controllers 322. Plugins 319 include storage plugin 324.

API server 302 provides an API for use by Kubernetes client 102 (e.g., kube-apiserver). API server 302 is the front end of orchestration control plane 115. The Kubernetes API provides a declarative schema for creating, updating, deleting, and viewing objects. State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state.

Namespaces provide scope for Kubernetes objects. Namespaces are objects themselves maintained in state database 303. A namespace can include resource quotas, limit ranges, role bindings, and the like that are applied to objects declared within its scope. A VI admin can cooperate with VM management server 116 to define supervisor namespaces for supervisor cluster 101. A supervisor namespace is a resource-constrained and authorization-constrained unit of multi-tenancy managed by VM management server 116. State database 303 stores namespace objects associated with the supervisor namespaces. VM management server 116 creates a namespace object in supervisor Kubernetes master 104 for each supervisor namespace, pushing down resource constraints and authorization constraints into orchestration control plane 115. A namespace is an example of a standard Kubernetes object. State database 303 can store various Kubernetes objects 340, including namespaces.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with VM management server 116. Scheduler extender 306 cooperates with VM management server 116 (e.g., such as with resource scheduler 108) to select nodes from candidate sets of nodes and provide identities of hosts 120 corresponding to the selected nodes. For each pod, scheduler 304 also converts the pod specification to a pod VM specification, and scheduler extender 306 asks VM management server 116 to reserve a pod VM on the selected host 120. Scheduler 304 updates pods in state database 303 with host identifiers.

A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems. A PLC for example, is responsible for tracking pods that have assigned nodes without pod VM identifiers. The PLC cooperates with VM management server 116 to commit reserved pod VMs for pods. VM management server 116 returns a pod VM identifier to the PLC, which in turn updates the pod in state database 303.

Pods are native objects of Kubernetes. The Kubernetes API can be extended with custom APIs 305 to allow orchestration and management of custom objects 307. A custom resource definition (CRD) can be used to define a custom object 307 to be handled by API server 302. Alternatively, an extension API server can be used to introduce a custom object 307 by API server aggregation, where the extension API server is fully responsible for the custom resource. A user interacts with custom APIs 305 of API server 302 to create custom objects 307 tracked in state database 303. A controller 308 is used to watch for and actuate on custom objects 307 declared in state database 303.

In an embodiment, orchestration control plane 115 is extended to support orchestration of persistent services. This extensibility can be implemented using either CRDs or an extension API server in supervisor Kubernetes master 104. A user or a controller 308 can invoke a custom API to create supervisor service objects, which represent custom persistent services. Persistent services controller 320 monitors for supervisor service objects and creates instances of custom persistent service controllers 322. Each custom persistent service controller 322 manages the lifecycle of a custom persistent service (e.g., a database).

For example, a user can specify a supervisor service object for a database application. In turn, persistent services controller 320 creates an instance of custom persistent service controller 322 for the database application. Thereafter, users can create instances of the database application through specification of database application CRDs monitored by custom persistent service controller 322.

Plugins 319 provide a well-defined interface to replace a set of functionality of the Kubernetes control plane. A network plugin is responsible for configuration of logical networking of SD networking 175 to satisfy the needs of network-related resources. Storage plugin 324 is responsible for providing a standardized interface for persistent storage lifecycle and management to satisfy the needs of resources requiring persistent storage. Storage plugin 324 provides an interface between orchestration control plane 115 and storage service 110.

Figure 4:
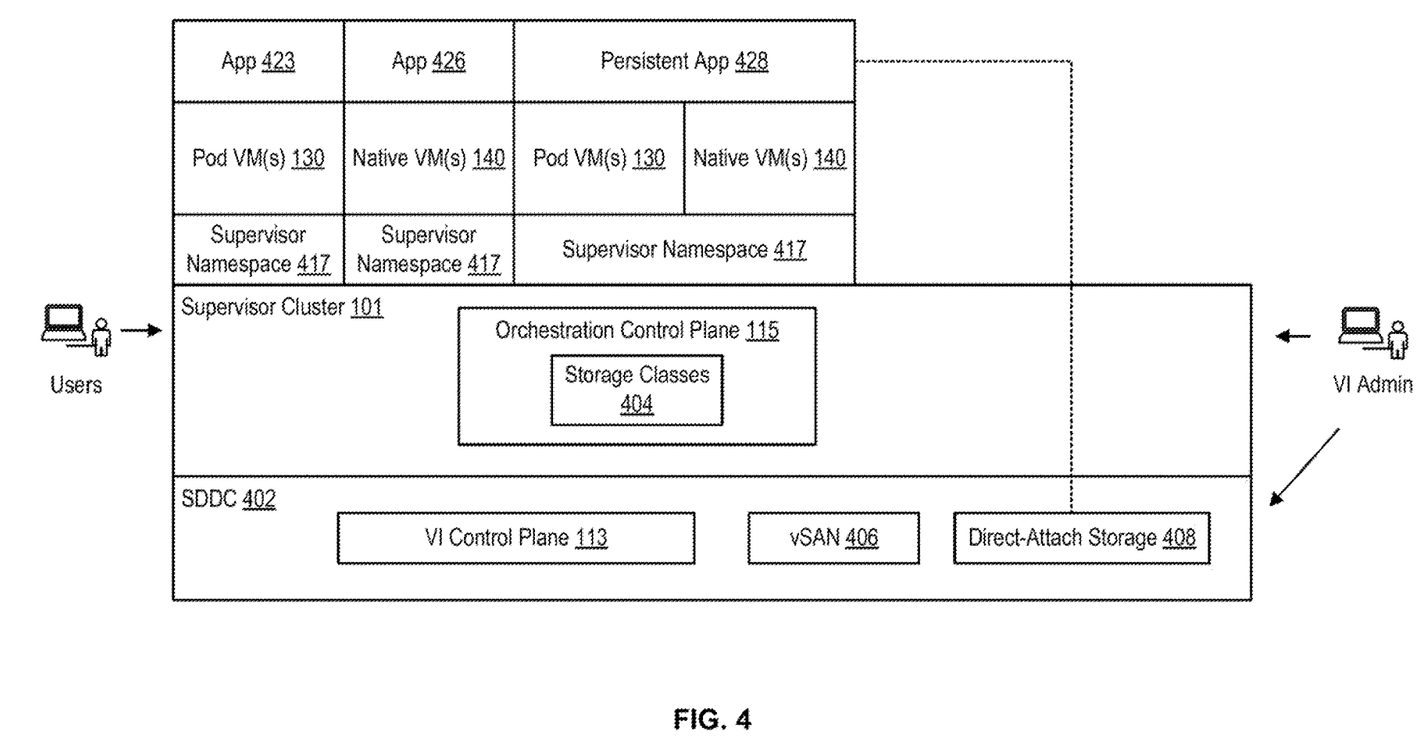
FIG. 4 is a block diagram depicting a persistent application deployed on a supervisor cluster according to an embodiment.

FIG. 4 is a block diagram depicting a persistent application deployed on a supervisor cluster according to an embodiment. Supervisor cluster 101 is implemented by a software-defined data center (SDDC) 402. SDDC 402 includes virtualized computing system 100 shown in FIG. 1, including host cluster 118, VM management server 116, network manager 112, storage manager 110, shared storage 170, and SD networking 175. SDDC 402 includes VI control plane 113 for managing a virtualization layer of host cluster 118, along with shared storage 170 and SD networking 175. In particular, SDDC 402 includes a vSAN 406 and direct-attach storage 408. The vSAN 406 is implemented using local storage 163 from a plurality of hosts 120. Direct-attach storage 408 includes a plurality of storage devices in local storage 163 of a plurality of hosts 120. Direct-attach storage 408 is exclusive of vSAN 406 (e.g., the storage devices of direct-attach storage 408 are not part of vSAN 406). A VI admin interacts with VM management server 116 (and optionally network manager 112) of VI control plane 113 to configure SDDC 402 to implement supervisor cluster 101.

Supervisor cluster 101 includes orchestration control plane 115, which includes supervisor Kubernetes master(s) 104 and pod VM controllers 216. The VI admin interacts with VM management server 116 to create supervisor namespaces 417. Each supervisor namespace 417 includes a resource pool and authorization constraints. The resource pool includes various resource constraints on supervisor namespace 417 (e.g., reservation, limits, and share (RLS) constraints). Authorization constraints provide for which roles are permitted to perform which operations in supervisor namespace 417 (e.g., allowing VI admin to create, manage access, allocate resources, view, and create objects; allowing users to view and create objects; etc.). A user interacts with Kubernetes master 104 to deploy applications on supervisor cluster 101 within scopes of supervisor namespaces 417. In the example, a user deploys an application 423 on pod VM(s) 130, an application 426 on native VM(s) 140, a persistent application 428 on pod VM(s) 130 and/or native VM(s) 140.

Each supervisor namespace 417 also includes storage classes 404 to be used when creating persistent volumes. In embodiments, one or more storage classes 404 are associated with vSAN 406. Persistent volume claims for applications (e.g., applications 423, 426) can reference storage classes 404 for vSAN 406. In such case, orchestration control plane 115 (through storage plugin 324) satisfies those persistent volume claims with persistent volumes stored in vSAN 406. In embodiments, one or more storage classes 404 are associated with direct-attach storage 408. Persistent volume claims for applications (e.g., persistent application 428) can reference storage classes 404 for direct-attach storage 408. In such case, orchestration control plane 115 (through storage plugin 324) satisfies those persistent volume claims with persistent volumes stored in direct-attach storage 408. In embodiments, storage classes 404 can be differentiated based on performance, where each storage class 404 can be implemented using a different type of storage (e.g., NVMe, SSD, hard disks, etc.) In embodiments, each storage class defined for direct-attach storage is an abstraction of the underlying local storage devices and their properties. Each storage class for the direct-attach storage is agnostic of the underlying local storage devices.

In embodiments, direct-attach storage 408 includes local storage devices in a plurality of hosts 120. These local storage devices are exempted from being used with vSAN 406. Each individual local storage device (e.g., NVMe devices, SSD devices, hard disk devices, etc.) presents a separate datastore available for placement of persistent volumes. Storage devices of similar performance characteristics can be grouped together into separate tiers and assigned to separate storage classes 404. In embodiments, VI admin can interact with virtualization management server 116 to manage each tier of direct-attach storage 408, which obviates the need for the VI admin to mange each storage device individually. Thus, persistent applications can obtain direct access to local storage devices in direct-attach storage 408, while VI admin can mange collections of local storage devices by tier for ease of management.

Figure 5:
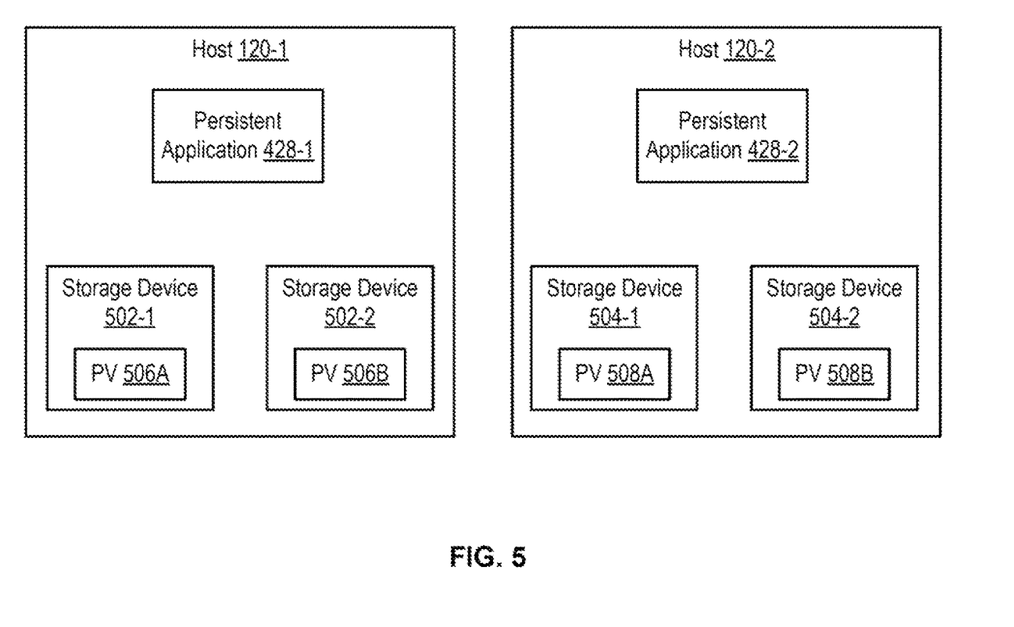
FIG. 5 is a block diagram depicting deployment of a persistent application across a plurality of hosts and using direct-attach storage according to an embodiment.

FIG. 5 is a block diagram depicting deployment of a persistent application across a plurality of hosts and using direct-attach storage according to an embodiment. As shown in FIG. 5, persistent applications 428-1 and 428-2 are instances of the persistent application. Orchestration control plane 115 places persistent application 428-1 in a host 120-1 and persistent application 428-2 in a host 120-2. As such, the persistent application can be replicated across multiple hosts 120 for redundancy. In the embodiment, the user specified the persistent application to have two persistent volume claims (PVCs) with a direct-attach storage class (assume one tier for clarity). In an embodiment, in addition to specifying the direct-attach storage class, the user can also specify anti-affinity rules for PVs so that they are placed on separate local storage devices. In the embodiment, orchestration control plane 115 binds two PVs 506A and 506B to satisfy the two PVCs, respectively. Orchestration control plane 115 places PV 506A on a storage device 502-1 of host 120-1, and PV 506B on a storage device 502-2 of host 120-1. Persistent application 428-1 accesses storage devices 502-1 and 502-2 directly without passing through a vSAN or other storage orchestrator. Likewise, orchestration control plane 115 binds two PVs 508A and 508B to the two PVCs for persistent application 428-2. Orchestration control plane 115 places PV 508A on a storage device 504-1 and PV 508B on a storage device 504-2, each in host 120-2. In the embodiment, PV 506A and PV 508A store two replicas of first persistent data, and PV 506B and 508B store two replicas of second persistent data.

Figure 6:
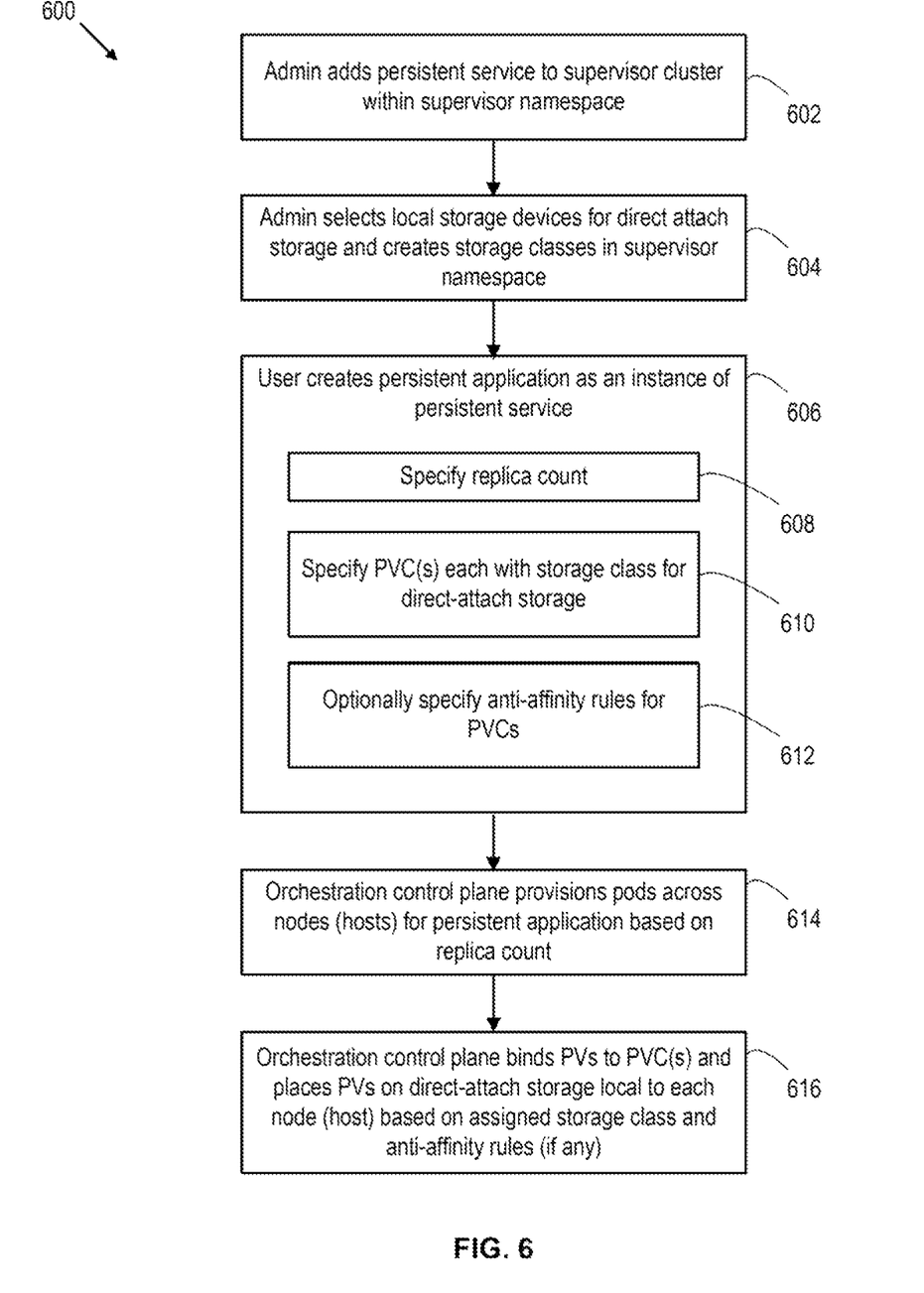
FIG. 6 is a flow diagram depicting a method of deploying a persistent application with direct-attached storage according to an embodiment.

FIG. 6 is a flow diagram depicting a method 600 of deploying a persistent application with direct-attached storage according to an embodiment. Method 600 can be performed by software executing in supervisor cluster 101, which comprises software executing on CPU, memory, storage, and network resources managed by a virtualization layer (e.g., a hypervisor).

Method 600 begins at step 602, where an administrator (e.g., VI Admin) adds a persistent service to supervisor cluster 101 within a supervisor namespace. In an embodiment, VI admin interacts with supervisor Kubernetes master 104 to specify the persistent service using the custom CRD(s) monitored by persistent services controller 320. In response, persistent services controller 320 generates an instance of custom persistent service controller 322 for the persistent service. At step 604, the administrator selects local storage devices in hosts 120 for direct attach storage and creates storage classes in the supervisor namespace. For example, VI admin can interact with virtualization management server 116 to select different types of storage devices in hosts 120 for use as direct-attach storage, such as NVMe, SSD, and hard disks. Virtualization management server 116 marks the selected local storage devices for direct-attach storage and exempts them from any other orchestrated storage for the cluster (e.g., vSAN). Virtualization management server 116 causes each direct-attach storage device to be formatted and to present a pool of storage (e.g., a datastore) for placement of PVs by orchestration control plane 115.

At step 606, a user creates a persistent application as an instance of the persistent service. In an embodiment, the user interacts with supervisor Kubernetes master 104 to specify the persistent application for implementation in pods. For example, at step 608, the user can specify a replica count for the persistent service. Each replica of the persistent service will execute in a different pod on a different node (host 120). At step 610, the user can specify one or more PVCs for the persistent application. Each PVC includes a specified storage class for direct-attach storage. Optionally, at step 612, the user can specify anti-affinity rules for the PVCs. For example, as shown in the example of FIG. 5, the persistent application can include two PVCs. Instances of PVs bound to the two PVCs are stored on separate storage devices within each host. In general, custom persistent service controller 322 can use annotations defined by API server 302 to specify how the persistent data is stored on the direct-attach storage. For example, the annotations can determine placement of the persistent data across a plurality of local storage devices configured as direct attach storage. Thus, a persistent application can obtain better performance by spreading the persistent data wider across the local storage devices or better fault tolerance by ensuring that two redundant shards of persistent data are not co-located on the same local storage device.

At step 614, orchestration control plane 115 provisions pods across nodes (hosts 120) for the persistent application based on the replica count. For example, if the replica count is three, orchestration control plane 115 provisions three pods across three separate hosts 120. At step 616, orchestration control plane 115 binds PVs to the PVC(s) and places the PVs on direct-attach storage local to each node (host 120) based on assigned storage class and anti-affinity rules (if any). For each PVC, orchestration control plane (e.g., supervisor Kubernetes master 104) binds a PV thereto and places the PV on a direct-attach storage device based on the selected storage class. Within each host 120, the PV is mounted within the pod executing the replica of the persistent application. In cases where the persistent application includes multiple PVCs with anti-affinity rules, orchestration control plane 115 places PVs on different direct-attach storage devices within each host 120 to satisfy the anti-affinity rules.

In method 600, steps 602 and 604 can be performed by the administrator once initially. Thereafter, steps 606-616 can be performed each time a user creates an instance of the persistent service.

Figure 7:
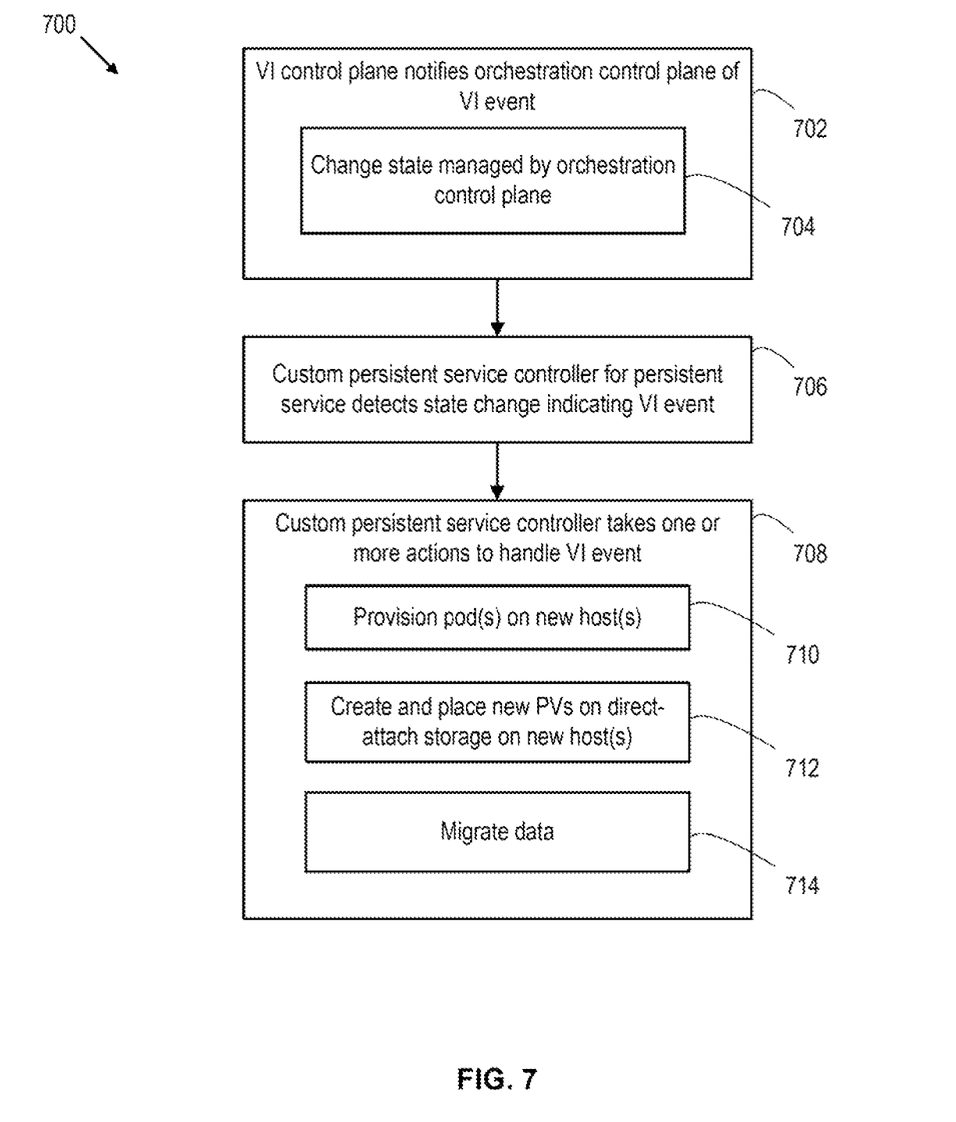
FIG. 7 is a flow diagram depicting a method of informing the orchestration control plane of VI events according to an embodiment.

FIG. 7 is a flow diagram depicting a method 700 of informing the orchestration control plane of VI events according to an embodiment. Method 700 can be performed by software executing in supervisor cluster 101, which comprises software executing on CPU, memory, storage, and network resources managed by a virtualization layer (e.g., a hypervisor).

Method 700 begins at step 702, where VI control plane 113 notifies orchestration control plane 115 of a VI event. For example, virtualization management server 116 can notify orchestration control plane 115 of events related to hosts 120, such as a host going into maintenance mode, a host being removed from host cluster 118, and the like. Such host events can have an impact on a deployed persistent application. For example, if a persistent application has two replicas, and one replica is placed on a host that will become inactive, then the persistent application loses its redundancy protection in terms of both service and data. If the remaining host were to become inactive, the persistent service would go down and data loss can occur. Accordingly, virtualization management server 116 notifies orchestration control plane 115 of such host events. In an embodiment, virtualization management server 116 cooperates with supervisor Kubernetes master 104 to modify state of the affected nodes (hosts) in state database 303 (step 704). This is referred to as installing "taints" on the affected nodes.

At step 706, custom persistent service controller 322 for a persistent service detects the state change that indicates the VI event. In an embodiment, custom persistent service controller 322 monitors the node objects for taints created by virtualization management server 116. At step 708, custom persistent service controller 322 takes one or more actions to handle the detected VI event. For example, at step 710, custom persistent service controller 322 can provision pod(s) on new host(s) to replace pod(s) on host(s) that will become inactive. Custom persistent service controller 322 identifies which nodes will became inactive through detecting taints on such nodes at step 706. At step 712, custom persistent service controller 322 can create and place new PVs on direct-attach storage in the new host(s). If a host is becoming inactive, then its direct-attach storage devices will also become inactive. Thus, when a new pod is deployed, new PV(s) are created for direct-attach storage in the new host and mounted in the pod for use by the persistent application. In this manner, when a node becomes inactive in host cluster 118, the persistent application can continue to operate with replication and data protection. At step 714, custom persistent service controller 322 migrates the data from the PVs on the node becoming inactive to the PVs on the new node.

Figure 8:
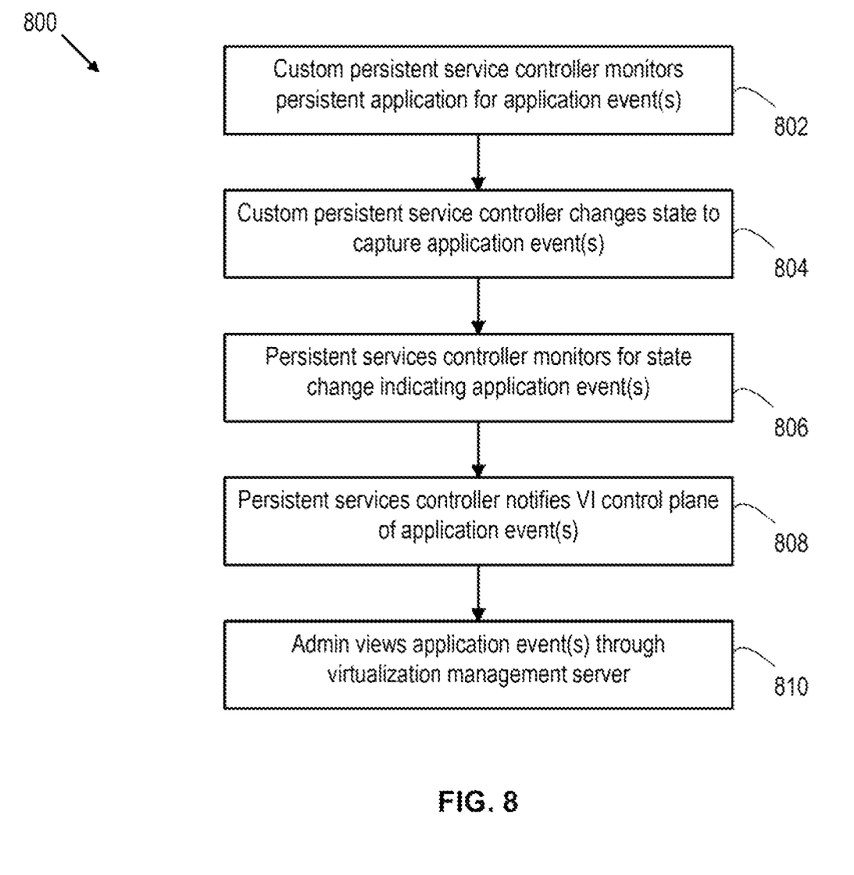
FIG. 8 is a flow diagram depicting a method of informing the VI control plane of application events according to an embodiment.

FIG. 8 is a flow diagram depicting a method 800 of informing the VI control plane of application events according to an embodiment. Method 800 can be performed by software executing in supervisor cluster 101, which comprises software executing on CPU, memory, storage, and network resources managed by a virtualization layer (e.g., a hypervisor).

Method 800 begins at step 802, where custom persistent service controller 322 monitors a persistent application being managed for application events. For example, custom persistent service controller 322 can monitor the persistent application for health information. At step 804, custom persistent service controller 322 change state in state database 303 to capture the application event(s). For example, custom persistent service controller 322 can change state on the supervisor service object associated therewith. At step 806, persistent services controller 320 monitors for the state change indicating the application event(s). For example, persistent service controller 320 can monitor all of the supervisor service objects in state database 303. At step 808, persistent services controller 320 notifies VI control plane 113 of the application event(s). For example, persistent services controller 320 can notify virtualization management server 116 of the application event(s). At step 810, VI admin views the application event(s) through interaction with virtualization management server 116. For example, the VI admin can monitor the health of a persistent application through application event(s) reported by orchestration control plane 115.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the requited operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM, RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A virtualized computing system, comprising:
   a cluster of hosts having a virtualization layer executing thereon and configured to manage virtual machines (VMs);
   first and second local storage devices in a first host of the cluster, the first local storage device being part of a virtual storage area network (vSAN) and the second local storage device being exclusive of the vSAN;
   an orchestration control plane, integrated with the virtualization layer, the orchestration control plane including a master server managing state of the orchestration control plane, the state including objects representing the hosts and the VMs, the orchestration control plane deploying a persistent application executing on a first VM of the VMs, the persistent application storing persistent data on the second local storage device; and
   a virtualization management server configured to manage the cluster and to cooperate with the orchestration control plane to modify the state to notify the master server of a virtual infrastructure (VI) event.

2. The virtualized computing system of claim 1, wherein the VI event is an indication that the first host is to become inactive.

3. The virtualized computing system of claim 1, further comprising:
   a custom service controller executing in the master server and configured to manage the persistent application;
   wherein the virtualization management server is configured to cooperate with the orchestration control plane to modify the state to notify the custom service controller of the master server of the VI event.

4. The virtualized computing system of claim 3, further comprising:
   a persistent services controller executing in the master server and configured to manage the custom service controller;
   wherein the custom service controller is configured to monitor an application event of the persistent application and modify the state to notify the persistent services controller.

5. The virtualized computing system of claim 4, wherein the persistent services controller is configured to notify the virtualization management service of the application event.

6. The virtualized computing system of claim 1, further comprising:
   a plurality of local storage devices in the cluster, the plurality of local storage devices configured as the vSAN and including the first local storage device.

7. The virtualized computing system of claim 1, wherein the state includes an object representing a persistent volume, wherein the persistent volume is placed on a direct-attach storage, and wherein the persistent application stores the persistent data on the persistent volume.

8. A method of deploying a persistent application in a virtualized computing system, the virtualized computing system including a cluster of hosts having a virtualization layer executing thereon and configured to manage virtual machines (VMs), a virtualization management server configured to manage the cluster, and an orchestration control plane, integrated with the virtualization layer, the orchestration control plane including a master server managing suite of the orchestration control plane, the method comprising:
   configuring a first local storage device in a first host of the cluster as part of a virtual storage area network (vSAN);
   configuring a second local storage device in the first host of the cluster as exclusive of the vSAN;
   deploying, by the orchestration control plane, the persistent application executing on a first VM of the VMs;
   deploying, by the orchestration control plane, a persistent volume on the second storage device, the persistent application storing persistent data on the second storage device;
   modifying, by the virtualization management server in cooperation with the orchestration control plane, the stale to notify the master server of a virtual infrastructure (VI) event.

9. The method of claim 8, wherein the VI event is an indication that the first host is to become inactive.

10. The method of claim 8, wherein the master server includes a custom service controller executing therein configured to manage the persistent application, and wherein the virtualization management server cooperates with the orchestration control plane to modify the state to notify the custom service controller of the master server of the VI event.

11. The method of claim 10, wherein the master server includes a persistent services controller executing therein configured to manage the custom service controller, the method further comprising:
    monitoring, by the custom service controller, an application event of the persistent application;
    modifying, by the custom service controller, the state to notify the persistent services controller of the application event.

12. The method of claim 11, further comprising:
    notifying, by the persistent services controller, the virtualization management server of the application event.

13. The method of claim 8, wherein a plurality of local storage devices in the cluster is configured as the vSAN, the plurality of local storage devices including the first local storage device.

14. The method of claim 8, wherein the state of the orchestration control plane includes objects representing the hosts, the VMs, and the persistent volume.

15. A non-transitory computer readable medium comprising instructions to be executed in a computing device to cause the computing device to carry out a method of deploying a persistent application in a virtualized computing system, the virtualized computing system including a cluster of hosts having a virtualization layer executing thereon and configured to manage virtual machines (VMs), a virtualization management server configured to manage the cluster, and an orchestration control plane, integrated with the virtualization layer, the orchestration control plane including a master server managing state of the orchestration control plane, the method comprising:
    configuring a first local storage device in a first host of the cluster as part of a virtual storage area network (vSAN);
    configuring a second local storage device in the first host of the cluster as exclusive of the vSAN;
    deploying, by the orchestration control plane, the persistent application executing on a first VM of the VMs;
    deploying, by the orchestration control plane, a persistent volume on the second local storage device, the persistent application storing persistent data on the second local storage device;
    modifying, by the virtualization management server in cooperation with the orchestration control plane, the state to notify the master server of a virtual infrastructure (VI) event.

16. The non-transitory computer readable medium of claim 15, wherein the VI event is an indication that the first host is to become inactive.

17. The non-transitory computer readable medium of claim 15, wherein the master server includes a custom service controller executing therein configured to manage the persistent application, and wherein the virtualization management server cooperates with the orchestration control plane to modify the state to notify the custom service controller of the master server of the VI event.

18. The non-transitory computer readable medium of claim 17, wherein the master server includes a persistent services controller executing therein configured to manage the custom service controller, the method further comprising:
   monitoring, by the custom service controller, an application event of the persistent application;
   modifying, by the custom service controller, the state to notify the persistent services controller of the application event.

19. The non-transitory computer readable medium of claim 18, further comprising:
   notifying, by the persistent services controller, the virtualization management server of the application event.

20. The non-transitory computer readable medium of claim 15, wherein a plurality of local storage devices in the cluster is configured as the vSAN, the plurality of local storage devices including the first local storage device.

* * * * *